United States Patent [19]

Ninomiya et al.

[11] Patent Number: 5,150,637
[45] Date of Patent: Sep. 29, 1992

[54] TRANSFER CASE SHIFTING APPARATUS FOR FOUR WHEEL DRIVE VEHICLE

[75] Inventors: Hiroshi Ninomiya; Satoshi Fujikawa, both of Hiroshima, Japan

[73] Assignee: Mazda Motor Corporation, Hiroshima, Japan

[21] Appl. No.: 663,053

[22] Filed: Feb. 27, 1991

Related U.S. Application Data

[63] Continuation-in-part of Ser. No. 438,176, Nov. 20, 1989, abandoned.

[30] Foreign Application Priority Data

Nov. 18, 1988 [JP] Japan .................. 63-290186

[51] Int. Cl.⁵ .................. F16H 59/02; B60K 17/35
[52] U.S. Cl. .................. 74/335; 180/249; 364/424.1
[58] Field of Search ......... 74/335, 336 R, 337; 364/424.1; 180/233, 249, 248

[56] References Cited

U.S. PATENT DOCUMENTS

| | | | |
|---|---|---|---|
| 4,484,653 | 11/1984 | Horikoshi et al. | 364/424.1 X |
| 4,567,969 | 2/1986 | Makita | 74/335 X |
| 4,723,624 | 2/1988 | Kawasaki et al. | 180/233 |
| 4,792,012 | 12/1988 | Morisawa et al. | 364/424.1 X |
| 4,830,132 | 5/1989 | Inagaki et al. | 364/424.1 |
| 4,846,010 | 7/1989 | Fujikawa et al. | 74/335 X |
| 4,872,525 | 10/1989 | Somirer | 364/424.1 X |
| 4,887,689 | 12/1989 | Naito | 364/424.1 X |
| 4,890,686 | 1/1990 | Hamada et al. | 364/424.1 X |
| 5,005,663 | 4/1991 | Niide et al. | 180/249 X |
| 5,035,158 | 7/1991 | Leigh-Monstevens | 180/233 X |
| 5,092,188 | 3/1992 | Fujikawa et al. | 364/424.1 X |

FOREIGN PATENT DOCUMENTS 60-127232 8/1985 Japan .

Primary Examiner—Richard Lorence
Assistant Examiner—Khoi Q. Ta
Attorney, Agent, or Firm—Fleit, Jacobson, Cohn, Price, Holman & Stern

[57] ABSTRACT

A transfer shift apparatus for shifting a vehicle between two wheel drive and four wheel drive includes a shift mechanism including a reversible motor which is continuously driven to rotate in one direction of rotation according to a shift signal so as to shift the vehicle into a desired drive condition. A motor drive controller controls the motor to stop its rotation when detecting a predetermined load on the motor and not to rotate in another direction for a predetermined time period from a time the shift signal disappears.

4 Claims, 10 Drawing Sheets

POSITION P2

POSITION P4L

POSITION P4F

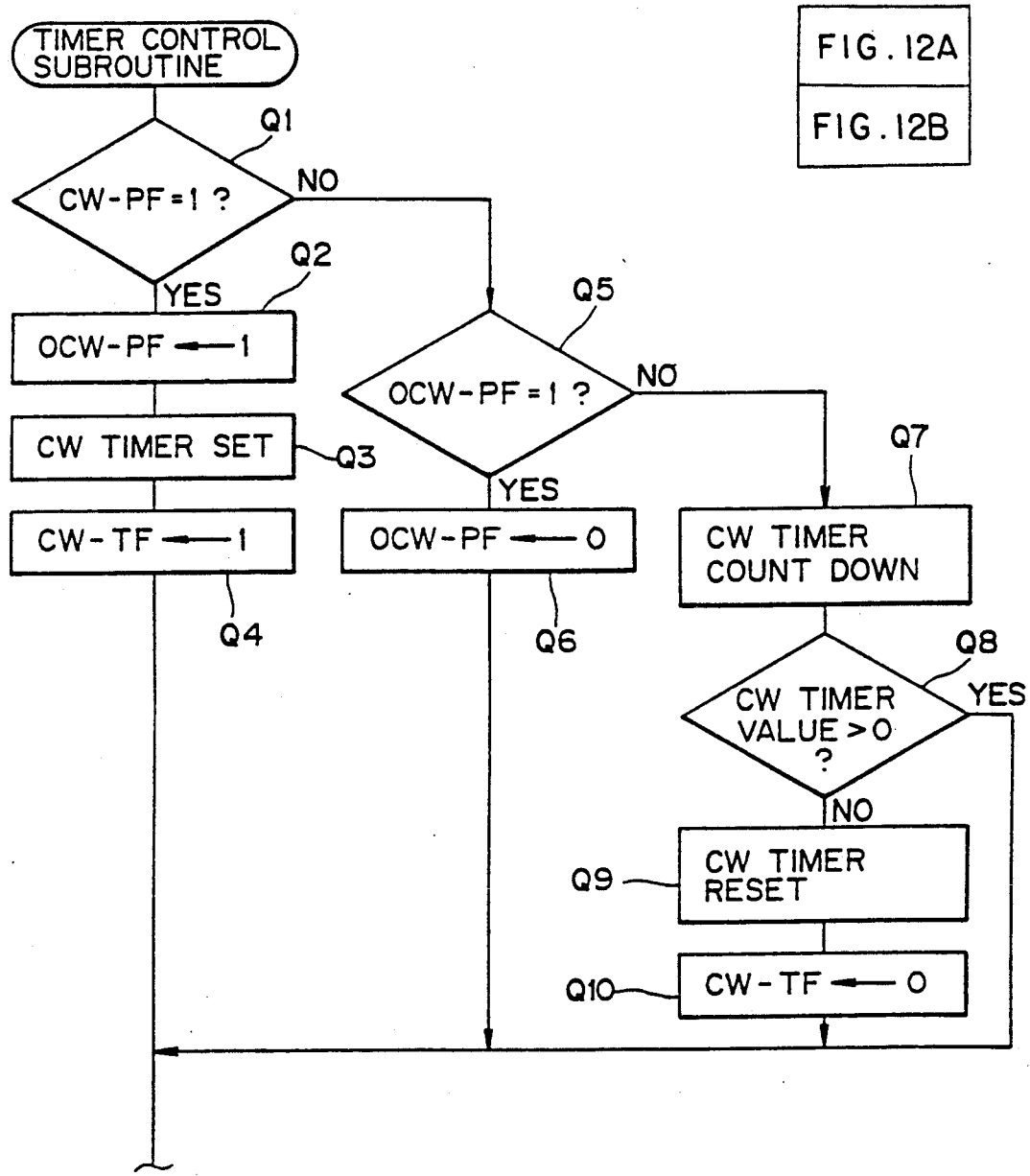

TRANSFER CASE SHIFTING APPARATUS FOR FOUR WHEEL DRIVE VEHICLE

This application is a Continuation-in-Part of U.S. patent application Ser. No. 07/438,176, filed Nov. 20, 1989 now abandoned.

BACKGROUND OF THE INVENTION

1. Field of the Invention

The present invention relates to a transfer case used on a vehicle equipped with four wheel drive and, more particularly, to an apparatus for causing a transfer case to shift the vehicle between two wheel drive and four wheel drive conditions.

2. Description of Related Art

In recent years, various types of automotive vehicles with four wheel drive transmission systems (which are hereinafter referred to simply as four wheel drive vehicles) have become increasingly popular. Some types of these four wheel drive vehicles are adapted to be shifted between two wheel and four wheel drive with a differential locked or unlocked condition. To manually shift such a four wheel drive vehicle among two wheel drive, four wheel drive with a differential locked condition and four wheel drive with a differential unlocked condition, a transmission is provided with a center differential having a shift mechanism provided with a shift member which is either manually operated or motor driven to move among three axial positions. Such a center differential is known from Japanese Utility Model publication No. 60(1985)-127,232 entitled "Apparatus For Dividing Power For Automotive Vehicle", laid open on Aug. 27, 1985.

One serious problem associated with the center differential having a motor driven shift mechanism is an interruption of smooth movement of the shift member to desired axial positions for some reasons which increases a load on a motor. To prevent a reversible motor of the shift mechanism from being subjected to such an excessive load, it was thought to provide a load detecting means which is actuated when loads larger than a predetermined load are exerted on the motor to shut off the supply of power to the motor and thereby stop the motor. The load detecting means is adapted to detect the predetermined load on the motor rotating in a normal direction or a reverse direction. However, if the load detecting means can not sense the direction of rotation of the motor, it sometimes happens that the load detecting means makes a misjudgement and allows the motor to stop when there is no excessive load on the motor. That is, there are many cases of shifting back the shift member to one axial position immediately after having shifted it from one to another axial position. In such cases, although the motor should be quickly reversed at the moment that the shift member is fully shifted to the other axial position, the motor can possibly over run in one direction in which it shifts the shift member toward the other axial position due to inertia of the motor, so as to actuate the load detecting means. If in fact the load detecting means is actuated due to the over running of the motor, the motor, although being provided with a reverse signal, is disabled from rotating in the other direction, and thereby it is impossible to shift the shift member to the other axial position so as to shift the drive condition of the vehicle. Although the problem may be of course successfully eliminated by providing the load detecting means for each direction of rotation of the motor, the provision of two load detecting means is unfavorable in structure and cost.

SUMMARY OF THE INVENTION

It is, therefore, one object of the present invention to provide a motor driven transfer case shift apparatus which, although having an over load detecting means incapable of detecting directions of an over load on a motor, can cause a transfer case to securely shift a vehicle into a desired drive condition.

The primary object of the present invention is achieved by a transfer case shifting apparatus having a shift means driven by a reversible motor to move between at least two positions for shifting a transfer case so as to shift a vehicle between at least two wheel drive and four wheel drive conditions. A directing means provides position signals for directing a desired one of the at least two positions to which the shift means is moved so as to shift the transfer case into a desired one of the two wheel drive and four wheel drive conditions. A control means receives the position signals to provide the reversible motor with a drive signal for continuously causing the reversible motor to rotate in one direction of rotation according to the received position signals so as to move the shift means to the desired one of the at least two positions. The control means is in cooperation with an over load detecting means which is actuated by loads larger than a predetermined load on the reversible motor to stop the reversible motor and a forbidding means for forbidding the reversible motor to rotate in another direction of rotation before an elapse of a predetermined time period from a disappearance of the drive signal from the control means.

According to the present invention, the reversible motor rotating in one direction is generally stopped in response to the actuation of the over load detecting means. However, after the disappearance of a driving signal to the reversible motor, the reversible motor is forbidden from rotating in another direction for a predetermined time period, thereby preventing the over load detecting means from being actuated by an inertial rotation of the reversible motor in the one direction. After the elapse of the predetermined time period, the reversible motor is allowed to rotate in the other direction even though the over load detecting means is still actuated. Accordingly, the transfer case shifting apparatus in accordance with the present invention prevents the reversible motor from being subjected to over loads and securely shifts the shift means to a desired position, so as to shift the vehicle securely and rapidly between at least two wheel drive and four wheel drive conditions.

BRIEF DESCRIPTION OF THE DRAWINGS

The foregoing and other objects, features and advantages of the present invention will be understood more clearly and fully from the following detailed description of the preferred embodiment with reference to the accompanying drawings wherein similar parts or elements are designated by the same reference numerals throughout the several drawings and in which:

FIGS. 12A and 12B show a flow chart illustrating a timer control subroutine for the microcomputer.

DESCRIPTION OF THE PREFERRED EMBODIMENT

A transfer case and its associated shift means according to a preferred embodiment of the present invention cooperate with various devices and elements, in particular an engine, an engine clutch, a transmission, front and rear axle assemblies and so forth, similar to those of conventional transfer cases. Because such devices and elements are well known to those skilled in the art, this description will be directed in particular to elements forming part of, or cooperating directly with, the transfer case and its associated shift control embodying the present invention. It is to be understood that elements of the transfer case and its associated shift control not specifically shown or described herein may be selected from those known in the art.

Figure 1:
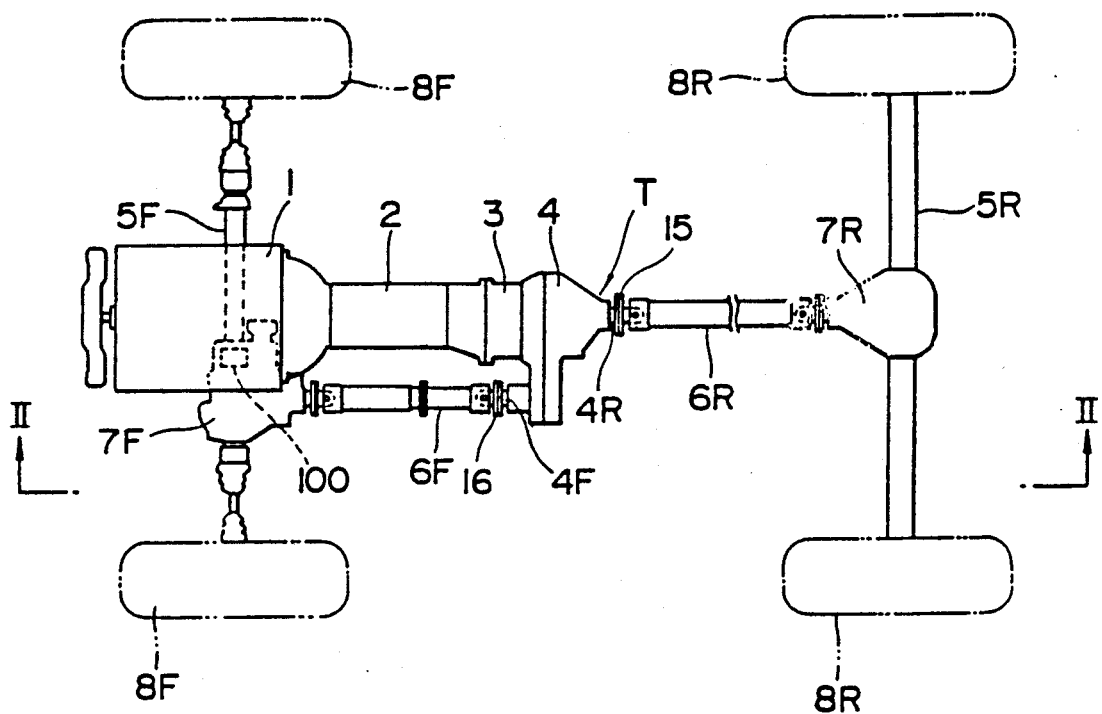
FIG. 1 is a schematic plan view showing a power train for a four wheel drive vehicle embodying the present invention.
Figure 2:
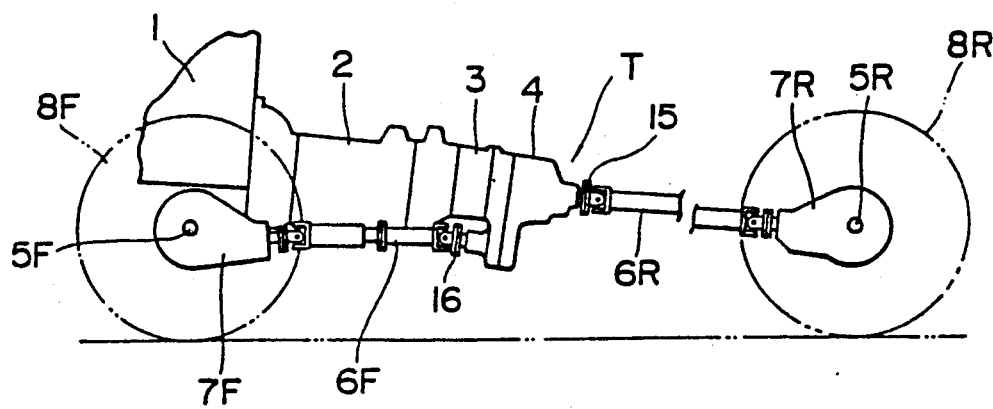
FIG. 2 is a schematic elevational view of the power train of FIG. 1.

Referring now to the drawings, there is generally schematically shown in FIGS. 1 and 2 a power train of an automotive vehicle equipped with part time four wheel drive which has an engine unit 1, a transmission case 2 connected to the engine 1 through an engine clutch (not shown), a transfer case T including a transfer gear assembly 3 and a center differential gear assembly 4 arranged in order from the front side of the automotive vehicle to the rear thereof. A rear wheel drive shaft or rear output shaft 4R of the center differential gear assembly 4 is coupled to a rear axle shaft 5R through a rear propeller shaft 6R and a rear axle differential case 7R by which a pair of rear wheels 8R are turned differentially. A front wheel drive shaft or front output shaft 4F of the center differential gear assembly 4, which is laterally spaced from and located in parallel with the rear output shaft 4R, is coupled to a front axle shaft 5F through a front propeller shaft 6F and a front axle differential case 7F by which a pair of front wheels 8F are turned differentially. As is well known to those skilled in the art, each propeller shaft 6R, 6F is coupled at its both ends to the output shaft 4R, 4F and the axle differential case 7R, 7F by means of universal joints.

The front axle 5F is equipped with a free wheeling means which, when the transfer case T is in a two wheel drive condition, disconnects the transmission of power between the front axle differential case 7F and the front wheels 8F. Operation and construction of such free wheeling means is well known to those skilled in the art and need not be explained in detail herein.

Figure 3:
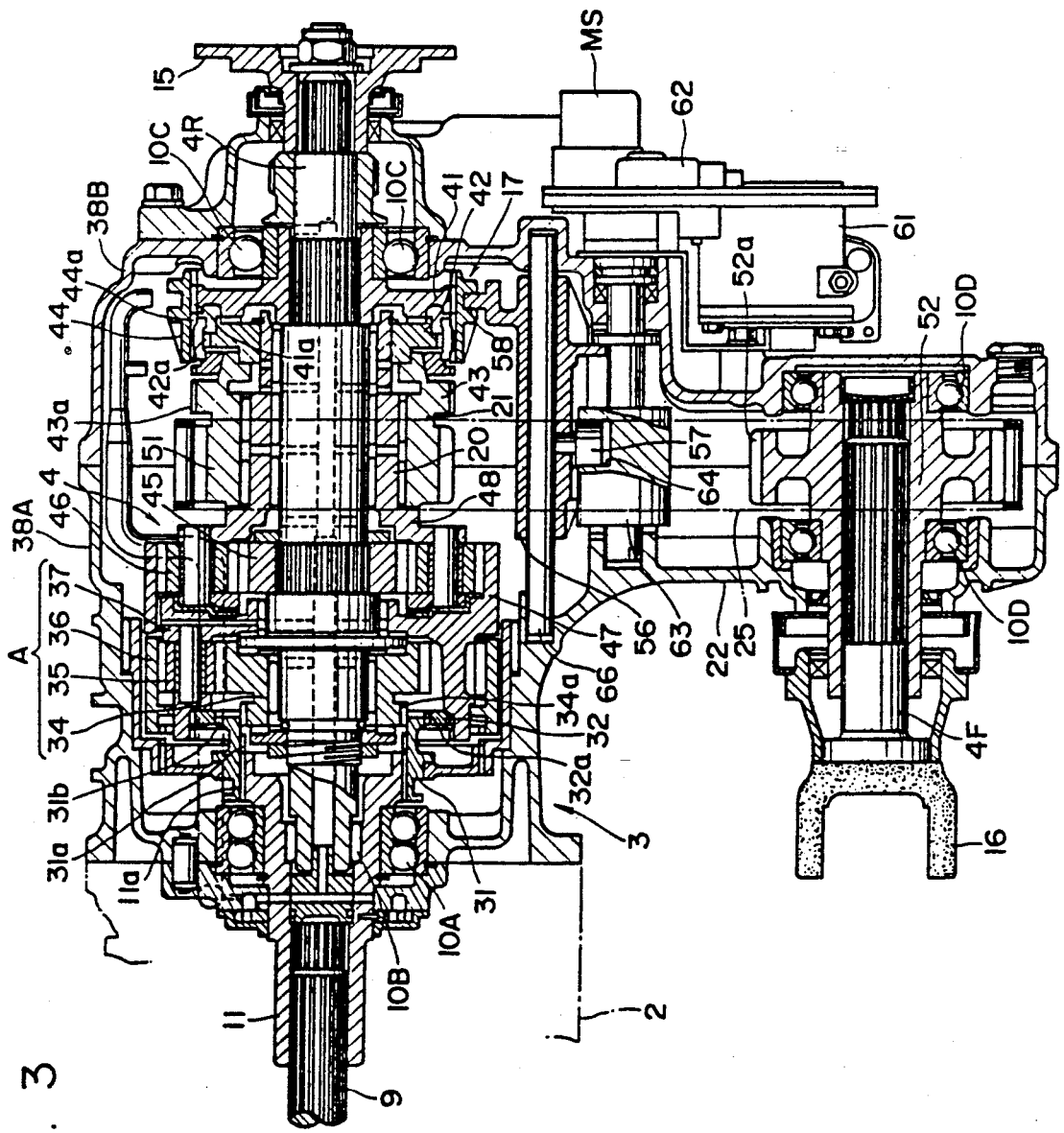
FIG. 3 is a sectional view showing details of the transfer case of the power train of the four wheel drive vehicle which is in a two wheel drive condition.

Referring now to FIG. 3, shown in longitudinal section is the transfer case T comprising the transfer gear assembly 3 and center differential gear assembly 4, each of which basically comprises a planetary gear assembly. As shown, the transfer case T has three rotatable shafts, namely, a transfer input shaft 11 in the form of a hollow tube which is supported by a ball bearing 10A held in a front-half transfer case housing 38A for rotation and is spline-coupled to an output shaft 9 of the transmission case or assembly 2; the rear output shaft 4R located coaxially relative to the transfer input shaft 11 and supported at its one end by a needle bearing 10B held in the transfer input shaft 11 and at its opposite end by a ball bearing 10C held in a rear-half transfer case housing 38B for rotation; and the front output shaft 4F laterally spaced from and located in parallel with both of the transfer input shaft 11 and the rear output shaft 4R and supported by a pair of ball bearings 10D held in an extension housing 22 formed by portions of the front-half and rear-half transfer case housings 38A and 38B. The transfer gear assembly 3 and the center differential gear assembly 4 which will be described in detail later are mounted on the rear output shaft 4R.

Arranged coaxially with the transfer gear assembly 3 and the center differential gear assembly 4 are two shift means, namely a transfer gear shift means in cooperation with the transfer gear assembly 3 on the front or left side of the transfer gear assembly 3 and a differential shift means 17 in cooperation with the center differential gear assembly 4 on the front or left side of the center differential gear assembly 4, as shown in FIG. 3.

The transfer gear assembly 3, which is selectively shiftable into a desired drive range, such as a low speed drive range or a high speed drive range, to transmit driving power with or without torque multiplication from the transmission case 2 to the center differential gear assembly 4, consists of first planetary gear assembly A having a ring gear 36 fixed to the front-half transfer housing 38A, a sun gear 34 mounted on the first sleeve shaft 18 spline-coupled to the rear output shaft 4R for rotation, and pinion gears 35 rotatably supported by a carrier member 37 fixed to the first sleeve shaft 18.

On the front side of the transfer gear assembly 3, there is the transfer gear shift means for shifting the transfer gear assembly 3 between the high and low drive operations. This transfer gear shift means, which basically takes the form of a sleeve clutch mechanism, consists of a clutch sleeve 31 formed with an internal spline 31a capable of engaging with an external spline 11a of the transfer input shaft 11 and a spline 34a of the sun gear 34 and an external spline 31b capable of engaging with a spline 32a of a clutch ring 32 formed integrally with the carrier member 37. The clutch sleeve 31 is axially movable to be selectively brought into spline engagement with the sun gear 34 or the clutch ring 32. When the clutch sleeve 31 is axially displaced into a position shown in FIG. 3, the clutch sleeve 31 engages with the clutch ring 32, thereby coupling the transfer input shaft 11 and the pinion gears 35 of the first planetary gear assembly A together so as to shift the transfer gear assembly 3 into the high speed drive range. At this time, the transfer input shaft 11 and the center differential gear assembly 4 are locked together through the carrier member 37 with which the clutch ring 32 is integrally formed. This gives direct drive between the transfer input shaft 11 and the center differential gear assembly 4 through the transfer gear assembly 3.

On the other hand, when the clutch sleeve 31 is moved axially toward the transfer gear assembly 3 until it is disengaged from the clutch ring 32, the clutch sleeve 31 is brought into spline-engagement with the spline 34a of the sun gear 34, thereby shifting the transfer gear assembly 3 into the low speed drive range so as to transmit driving power with a torque multiplication from the transfer input shaft 11 of the transfer gear assembly 3, specifically the sun gear 34, to the ring gear 36 through the pinion gears 35, and hence to the center differential gear assembly 4 in cooperation with the carrier member 37 of the first planetary gear assembly A of the transfer gear assembly 3.

The center differential gear assembly 4, which can drive both the front and rear axles at the same time but allows them to turn at different speeds as is well known in the art, consists of a second planetary gear assembly that comprises a sun gear 45 formed integrally with a periphery of the middle section of the rear output shaft 4R; a ring gear 47 formed integrally with the rear end portion of the carrier member 37 of the first planetary gear assembly A; pinion gears 46 rotatably attached to carrier member 48 which is integral with sleeve shaft 20 mounted on the rear output shaft 4R for rotation; and a carrier 48 rotatably mounting the pinion gears 46.

On the rear side of the center differential gear assembly 4, there is the differential shift means 17 which shifts the vehicle between two wheel drive and four wheel drive or between four wheel drive with a differential unlocked condition and a differential locked condition. This differential shift means 17 consists of a clutch ring 41 spline-coupled to the rear output shaft 4R, a clutch ring 42 spline-coupled to the sleeve shaft 20, a clutch ring 43 formed integrally with a sleeve shaft 21 which is mounted on the sleeve shaft 20 for rotation, and a clutch sleeve 44. The clutch sleeve 44, which is spline-coupled to the clutch ring 42, is axially movable to selectively engage with the clutch ring 41 or 43 so as to shift the center differential gear assembly 4 into a desired drive condition. The sleeve shaft 21 is integrally formed with a driving sprocket wheel 51 which is connected to a driven sprocket wheel 52 formed integrally with the front output shaft 4F by means of a chain 25 (shown by a dotted line in FIG. 3).

This differential shift means 17 can shift the center differential gear assembly 4 into any one of three different drive conditions: a two wheel drive condition, a four wheel drive with a differential unlocked condition and four wheel drive with a differential locked condition.

Figure 4A:
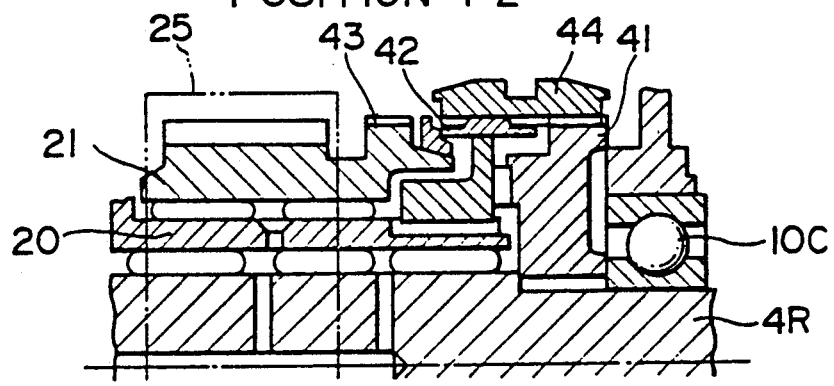
FIGS. 4A to 4C are sectional views showing details of a center differential shift means of the transfer case shown in FIG. 3 which are in two wheel drive condition, four wheel drive with a differential locked condition and four wheel drive with a differential unlocked condition, respectively.

When the differential shift means 17 is in the two wheel drive condition as is shown in FIG. 3, or in more detail in FIG. 4A, the clutch sleeve 44 is in engagement with the clutch rings 41 and 42 and, on the other hand, disengaged from the clutch ring 43. Under the two wheel drive condition, the sun gear 45 and the pinion gears 46 of the second planetary gear assembly are locked together, transmitting driving torque from the ring gear 47 of the second planetary gear assembly directly to the rear output shaft 4R.

Figure 4B:
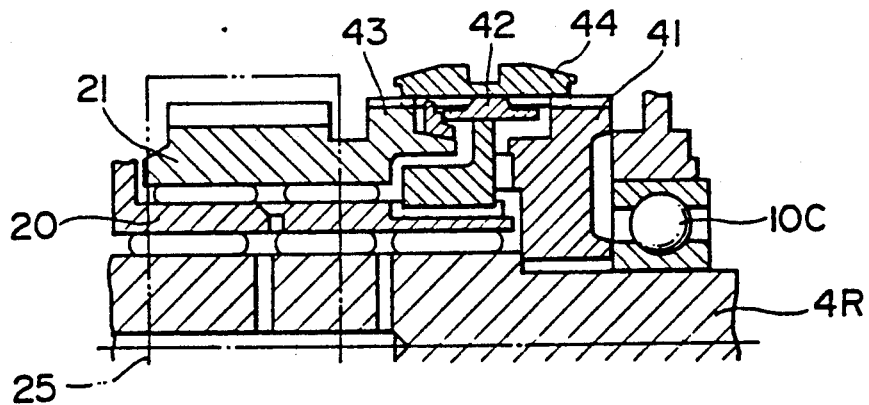
Figure 4C:
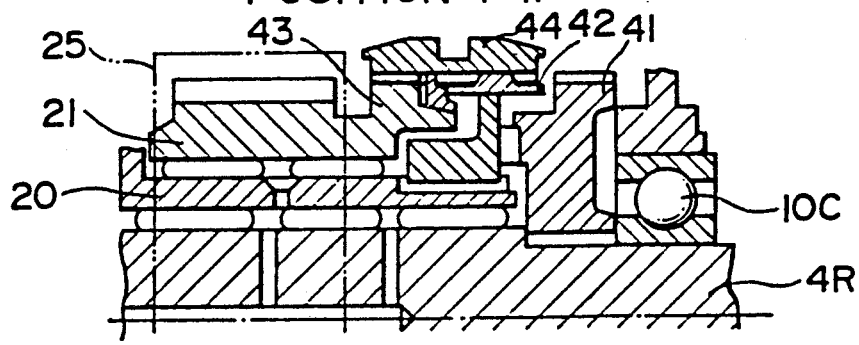

When the differential shift means 17 is in the four wheel drive with a differential unlocked condition as is shown in FIG. 4C, the clutch sleeve 44 is in spline engagement with the clutch rings 42 and 43 but out of engagement with the clutch ring 41. Therefore, the sleeve shafts 20 and 21 are locked through the clutch rings 42 and 43 to put the center differential gear assembly 4 in the four wheel drive with a differential unlocked condition. As a result, the center differential gear assembly 4 allows the front and rear output shafts 4F and 4R to turn at different speeds when negotiating a turn.

When the differential shift means 17 is ready for the four wheel drive with a differential locked condition as is shown in FIG. 4B, the clutch sleeve 44 is in engagement with all the three clutch rings 41, 42 and 43. Under this four wheel drive with a differential locked condition, the sleeve shafts 20 and 21 are locked together to maintain the center differential gear assembly 4 in the four wheel drive condition. Simultaneously, since the rear output shaft 4R and the third sleeve shaft 20 are locked together, the center differential gear assembly 4 is placed in the four wheel drive with a differential locked condition. As a result, the center differential gear assembly 4 drives the front and rear output shafts 4F and 4R at the same time and prevents them from turning at different speeds.

As can be understood from the above description, since the clutch ring 41 is spline-coupled to the rear output shaft 4R with which the sun gear 45 of the center differential gear assembly 4 is integrally formed and the clutch ring 42 is spline-coupled to the sleeve shaft 20 to which the pinion gears 46 of the second planetary gear assembly are fixed by the integrally formed carrier member 48, the clutch rings 41 and 42 are allowed to make a relative rotation slightly either in the opposite directions or the same direction with respect to each other by the aid of a backlash or play produced between the sun gear 45 and the pinion gears 46 of the second planetary gear assembly. The use of a backlash in order to provide such a relative rotation is well known. Due to this relative rotation between the clutch rings 41 and 42, the clutch sleeve 44 can be smoothly and easily brought into spline engagement with the clutch gear 41, thereby coupling together the sun gear 45 and the pinion gears 46 of the second planetary gear assembly serving as the center differential gear assembly 4.

On the other hand, since the sleeve shaft 21 having the clutch ring 43 formed integrally therewith is mounted for rotation on the sleeve shaft 20 having the clutch ring 42, the clutch rings 42 and 43 are also allowed to rotate relative to each other by the aid of relative rotation between the sleeve shafts 20 and 21 from a rotational play produced between the sleeve shafts 20 and 21. Due to this relative rotation between the sleeve shaft 20 and 21, the clutch sleeve 44 can be easily and smoothly brought into spline engagement with the clutch ring 43 and, simultaneously, brought out of engagement with the clutch ring 41, so as to couple together the pinion gears 46 of the second planetary gear assembly as an output member of the center differential gear assembly 4 and the driving sprocket wheel 51, and hence the front output shaft 4F through the driven sprocket wheel 52.

For shifting the center differential gear assembly 4 between different drive conditions by means of the differential shift means 17, there is provided a control unit 60 (see FIG. 6) consisting of a microcomputer for controlling a reversible electric motor 61 with a reduction gear 62 which cooperates with a shift control rod 63 supported by the front-half and rear-half transfer case housings 38A and 38B for rotation and having a cam groove 64 formed on its outer periphery thereof. Placed in juxtaposition with the shift control rod 63 is a guide rod 66 on which a shift sleeve 56 is slidably mounted. The shift sleeve 56 is provided with a connecting pin or cam follower 57 which is slidably received in the cam groove 64 of the shift control rod 63. A shift fork 58 integrally formed with the shift sleeve 56 is received in an annular groove formed in the periphery of the clutch sleeve 44 of the differential shift means 17. The cam follower 57 and fork member 58 are axially spaced from and extending radially oppositely to each other.

Figure 5:
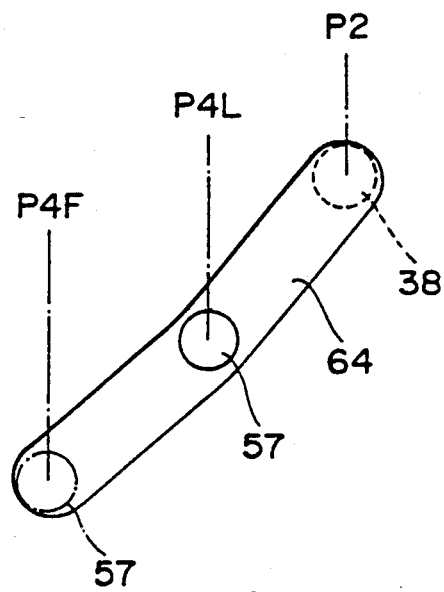
FIG. 5 is an enlarged view illustrating a cam profile.

As is shown in detail in FIG. 5, the cam groove 64 formed on the periphery of the shift control rod 63 is shaped to shift the shift sleeve 56, and hence the shift fork 58, along the guide rod 66 so as to place the clutch sleeve 44 to the position $P_2$, $P_{4L}$ or $P_{4F}$ for two wheel drive condition, four wheel drive with a differential locked condition or four wheel drive differential unlocked condition, respectively. That is, as the shift control rod 63 turns in a clockwise direction, the cam follower 57 displaces the position of the cam follower 57 with respect to the cam groove 64 from one to another extreme position of the cam groove 64 through the middle position, thereby axially shifting the clutch sleeve 44 so as to shift the center differential gear assembly 4 from two wheel drive (P2) to four wheel drive with a differential unlocked condition (P4F) via four wheel drive with a differential locked condition (P4L). In more detail, when the cam follower 57 is placed in its one extreme position in the cam groove 64, the clutch sleeve 44 is brought into spline engagement with the clutch rings 41 and 42 and, on the other hand, is disengaged from the clutch ring 43. When the cam follower 57 is -placed in its other extreme position in the cam groove 64, the clutch sleeve 44 is brought into spline engagement with the clutch rings 42 and 43 but out of engagement with the clutch ring 41. When the cam follower is placed in its middle position in the cam groove 64, the clutch sleeve 44 is brought into spline engagement with all three clutch rings 41, 42 and 43.

Figure 6:
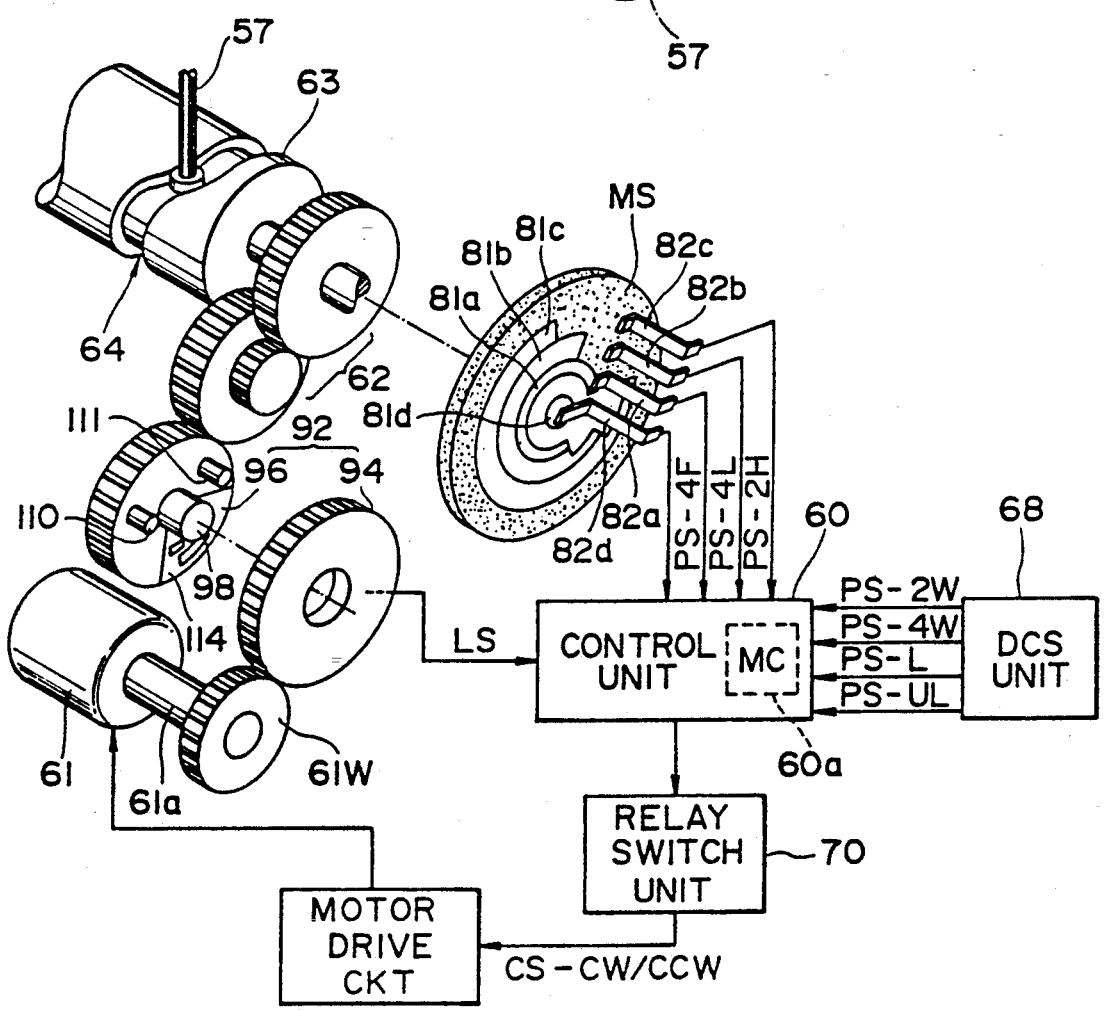
FIG. 6 is a schematic perspective view of a mechanical over load detecting means of the center differential shifting means of the transfer case shown in FIG. 3 in cooperation with control units.
Figure 7:
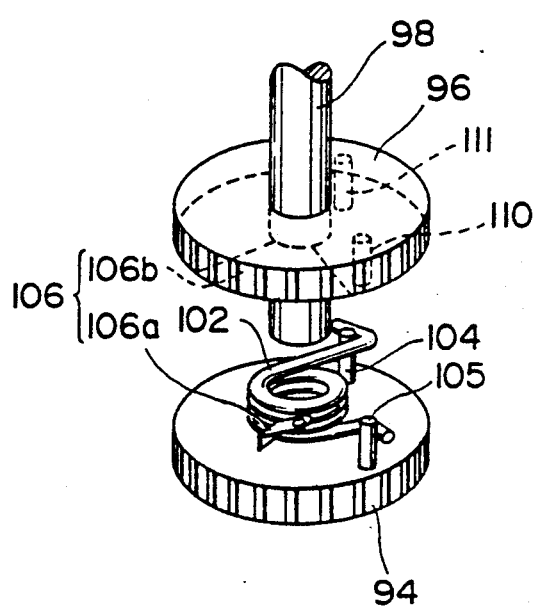
FIG. 7 is an exploded perspective view of the over load detecting means shown in FIG. 6.

Shown by MS in FIG. 3 is a drive condition sensor provided to detect angular positions of the shift control rod 63. As is shown in FIG. 6, the drive condition sensor MS comprises a printed contact disc having arcuate electric contacts 81a to 81d printed thereon and fixed electric contacts 82a to 82d provided one individual to each arcuate printed contact to provide drive condition signals corresponding to selected drive conditions. The contacts 81d and 82d are used as common contacts for the other three. Specifically, when the drive motor 61 rotates to turn the shift control rod 63 through an angle necessary to axially displace the shift fork 58 so as to place the clutch sleeve 44 of the differential shift means 17 in the position P2 in order to shift the center differential gear assembly 4 into two wheel drive condition, the printed contact 81c of the contact disk is brought into contact with the fixed contact 82c to provide a position signal PS-2H. In a similar manner, when the drive motor 61 rotates to turn the shift control rod 63 so as to place the second clutch sleeve 44 of the differential shift means 17 in the position P4L in order to shift the center differential gear assembly 4 into four wheel drive with a center differential locked condition, the printed contact 81b of the contact disk is brought into contact with the fixed contact 82b to provide a position signal PS-4L, or to the position P4F in order to shift the center differential gear assembly 4 into four wheel drive with a center differential unlocked condition. Similarly, the printed contact 81a of the contact disk is brought into contact with the fixed contact 82a to provide a position signal PS-4F. These position signals are sent to the control unit 60. When the control unit 60 receives any drive condition signal, it stops the drive motor 61. The control unit 60 operates in accordance with various drive condition control signals PS-2W, PS-4W, PS-L, PS-UL and so forth provided by drive condition selecting (DCS) unit 68 including a selecting lever and switches operated by a driver in a driver's compartment of the vehicle so as to shift the transfer case T into desired drive conditions.

As is shown in great detail in FIG. 6, the differential shift means 17 cooperates with a mechanical over load detector 92. The shift control rod 63 formed with the cam groove 64 and connected with the drive condition sensor MS which provides the control unit 60 with various drive condition signals PS-2W, PS-4W, PS-L and PS-UL is coupled to the electric motor 61 through the reduction gear train 62 and the mechanical over load detector 92. The over load detector 92 comprises a drive gear 94 in mesh with a worm gear 61W connected to an output shaft 61a of the electric motor 61 and a driven gear 96 rotatively coupled to the shift control rod 63 through the reduction gear train 62. It is to be noted that the drive and driven gears 94 and 96 are generally made of electrically non-conductive materials.

Figure 8A:
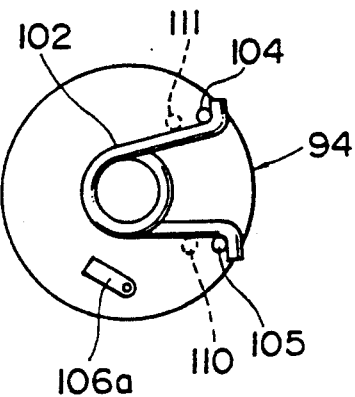
FIG. 8A is a plan view of one member of the over load detecting means shown in FIG. 7.
Figure 8B:
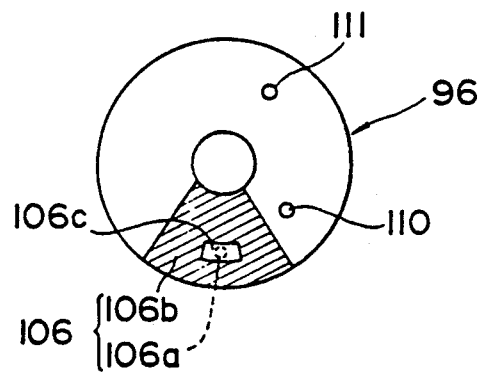
FIG. 8B is a plan view of another member of the over load detecting means shown in FIG. 7.
Figure 8C:
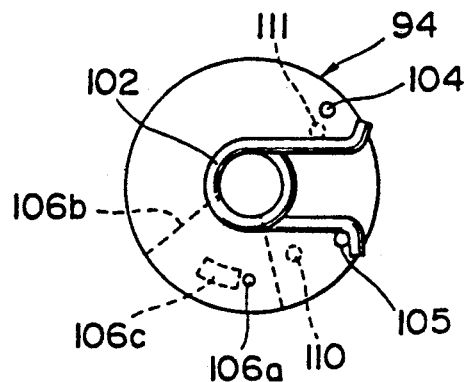
FIG. 8C is a plan view of the over load detecting means shown in FIG. 7.

The drive gear 94 mounted for rotation on a shaft 98 fixed to the driven gear 96 is provided with a torsion coil spring 102 mounted on the shaft 98 and held by a pair of studs 104 and 105 secured to the drive gear 94. The drive gear 94 is further provided with electrically conductive two point contact slider 106a which is in slidable contact with the surface of the driven gear 96 and connected to the control unit 60. The driven gear 96, facing the drive gear 94, is provided with a pair of studs 110 and 111 which are brought into contact with the torsion coil spring 102 when the driven gear 96 turns in the opposite directions and is formed with a sector-shaped electrically conductive area 106b (which is shaded in FIG. 8B) adjacent the extremities of movement of a contact slider 106a. The contact slider 106a and conductive area 106b form a limit switch 106 which provides the control unit 60 with a motor stop signal LS upon being turned on as will be described later. In the conductive area 106b, an electrically non-conductive segment 106c is formed. The contact slider 106a and the non-conductive segment 106c are so located on the drive and driven gears 94 and 96, respectively as to contact with each other when no external force is exerted on the drive and driven gears 94 and 96 in their rest positions, thereby shutting off the limit switch 106.

When the motor 61 continues to rotate in any direction, a relative displacement is caused between the drive and driven gears 94 and 96. That is, when the motor 61 continues to rotate in the clockwise direction or the normal direction, as viewed in FIG. 6, the torsion coil spring 102 is compressed by and between the stud 104 of the drive gear 94 and the stud 110 of the driven gear 96, increasingly charging or storing a torsional stress therein. The larger the amount of relative displacement between the drive and driven gears 94 and 96 becomes, the greater the torsional stress charged in the torsion coil spring 102 becomes. If the relative displacement between the drive and driven gears 94 and 96 becomes so large as to make the contact slider 106a come off the conductive area 106b, the limit switch 106 turns on. The torsion coil spring 102 is designed to have a spring constant sufficient so as to allow the drive and driven gears 94 and 96 to displace relative each other sufficiently for turning on the limit switch 106 to provide a motor stop signal LS when the previously noted predetermined load is on the motor 61. The limit switch 106 is also turned on to provide a motor stop signal LS when the motor 61 continues to rotate in the counterclockwise direction or the reverse direction. Although the mechanical over load detector 92 may be incorporated anywhere between the motor 61 and the clutch sleeve 44, it is preferred to couple the mechanical over load detector 92 as close to the motor 61 as possible for detection of an over load with a high accuracy. When the control unit 60 receives a motor stop signal LS, it provides a relay switch unit 70 with a motor drive signal for disabling a motor drive circuit 69 so as to stop the motor 61.

OPERATION

The operation of the transfer case shift control apparatus shown in FIGS. 1 to 8C is best understood by reviewing FIGS. 9 to 13, which are timing charts and flow charts illustrating various routines and subroutines for the microcomputer (MC) 60a of the control unit 60. Programming a microcomputer is a skill well understood in the art. The following description is written to enable a programmer having ordinary skill in the art to prepare an appropriate program for the microcomputer 60a. The particular details of any such program would of course depend upon the architecture of the particular computer selected.

Figure 9:
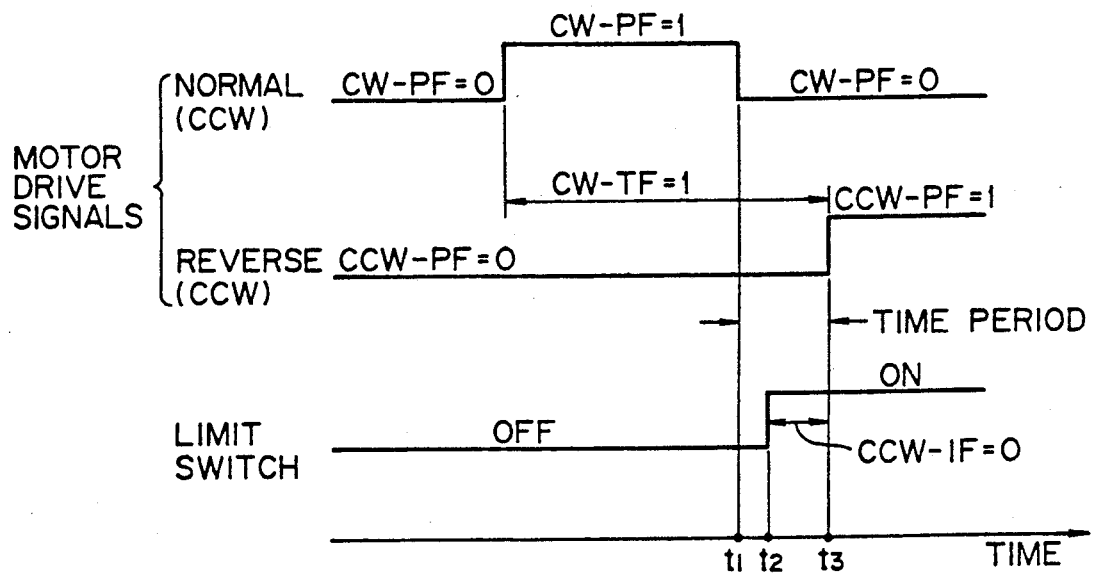
FIG. 9 is a timing chart showing the control of a reversible motor of the center differential.

Referring first to FIG. 9, shown is a timing chart illustrating a operational relationship between the motor 61 and the limit switch 106 in the case that the motor 61 acts to rotate first in the clockwise or normal direction (which is referred to as a CW direction) and is then reversed to rotate in the counterclockwise or reverse direction (which is referred to as a CCW direction) at a time t1. To cause the motor 61 to rotate in the CW direction in order to, for example, shift the center differential from two wheel drive (P2) to four wheel drive with a differential locked condition (P4L) (or alternatively, from four wheel drive with a differential locked condition (P4L) to four wheel drive with a differential unlocked condition (P4F), the driver operates the drive condition selecting (DCS) unit 68 to provide the control unit 60 with control signals PS-4W and PS-L (or, alternatively, with control signals PS-4W and PS-UL). As is apparent from FIGS. 6 and 9, after the center differential has been shifted into the P4L condition, if the DCS unit is operated at time t₁ to provide control unit 60 with control signals PS-2W and PS-UL, the control unit 60 causes the relay switch 70 to remove a control signal CS-CW from the motor drive circuit 69 so as to disable the motor 61 from rotating in the CW direction. Although the control unit 60 may control the relay switch 70 to provide the motor drive circuit 69 with a motor drive signal CS-CCW so as to reverse the motor 61 and cause it to rotate in the CCW direction, nevertheless, the control unit 60 in this embodiment is adapted to interrupt the motor 61 from starting its rotation in the CCW direction for a predetermined time period defined between the times t1 and t3. When the drive and driven gears 94 and 96 are actuated to cause a relative displacement therebetween so as to turn on the limit switch 106, at a time t2, in the predetermined time period t1-t3, the relative displacement is considered to be caused due to an inertial rotation of the motor 61 in the CW direction. If in fact the relative displacement between 94 and 96 is caused in the time period t1-t3, the control unit 60 decides that the motor 61 is continuously rotating in the CW direction. At the moment of the elapse of such time period t1-t3, the control unit 60 causes the relay switch 70 to provide the motor drive circuit 69 with a motor drive signal CS-CCW so as to allow the motor 61 to rotate in the CCW direction.

Main Routine

Figure 10:
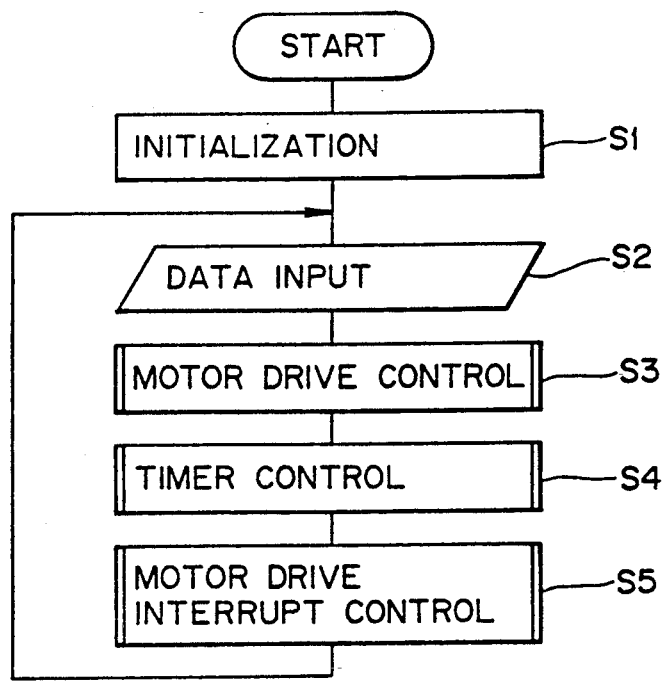
FIG. 10 is a flow chart illustrating a general sequence or main routine for a microcomputer which controls operation of the center differential shown in FIG. 3.

Referring to FIG. 10, which is a flow chart of the main or general sequence routine for the microcomputer MC of the control unit 60, after initializing the microcomputer MC in step S1, the outputs of the drive condition sensor MS and the drive condition selecting units 68 are read to determine the condition of the center differential and a desired drive condition in step S2. Thereafter, various subroutines, such as a motor drive control subroutine, a timer control subroutine and a motor drive interrupt subroutine, are effected in order in steps S3, S4 and S5, respectively. It is to be noted that CW and CCW as used herein shall mean and refer, respectively, to clockwise or normal direction and counterclockwise or reverse direction of rotation of the motor 61 and that various flags as used herein shall mean and refer to the following:

(1) When the motor 61 is in a condition where power to the motor 61 is cut off or not cut off, power flags CW-PF and CCW-PF are set to 0 or 1, respectively;

(2) when the predetermined time has not elapsed or elapsed, timer flags CW-TF and CCW-TF are set to 0 or 1, respectively, and the timer flags and CCW-TF are set to the motor 61 is rotating in the CW direction and CCW direction, respectively, so as to prevent the control unit 60 from outputting a motor drive signal CS-CW or CS-CCW which causes the motor 61 to rotate in one direction during outputting a motor drive signal CS-CCW or CS-CW causing the motor 61 to rotate in another direction;

(3) when motor drive interrupt flag CW-IF or CCW-IF is set to 1, the motor 61 is interrupted from rotating and when the motor drive interrupt flag is set to 0, the motor 61 is allowed to rotate; and (4) when the limit switch 92 is in an active or an inactive condition, limit switch flags LF are set to 1 or 0, respectively.

Motor Drive Control Subroutine

Figure 11:
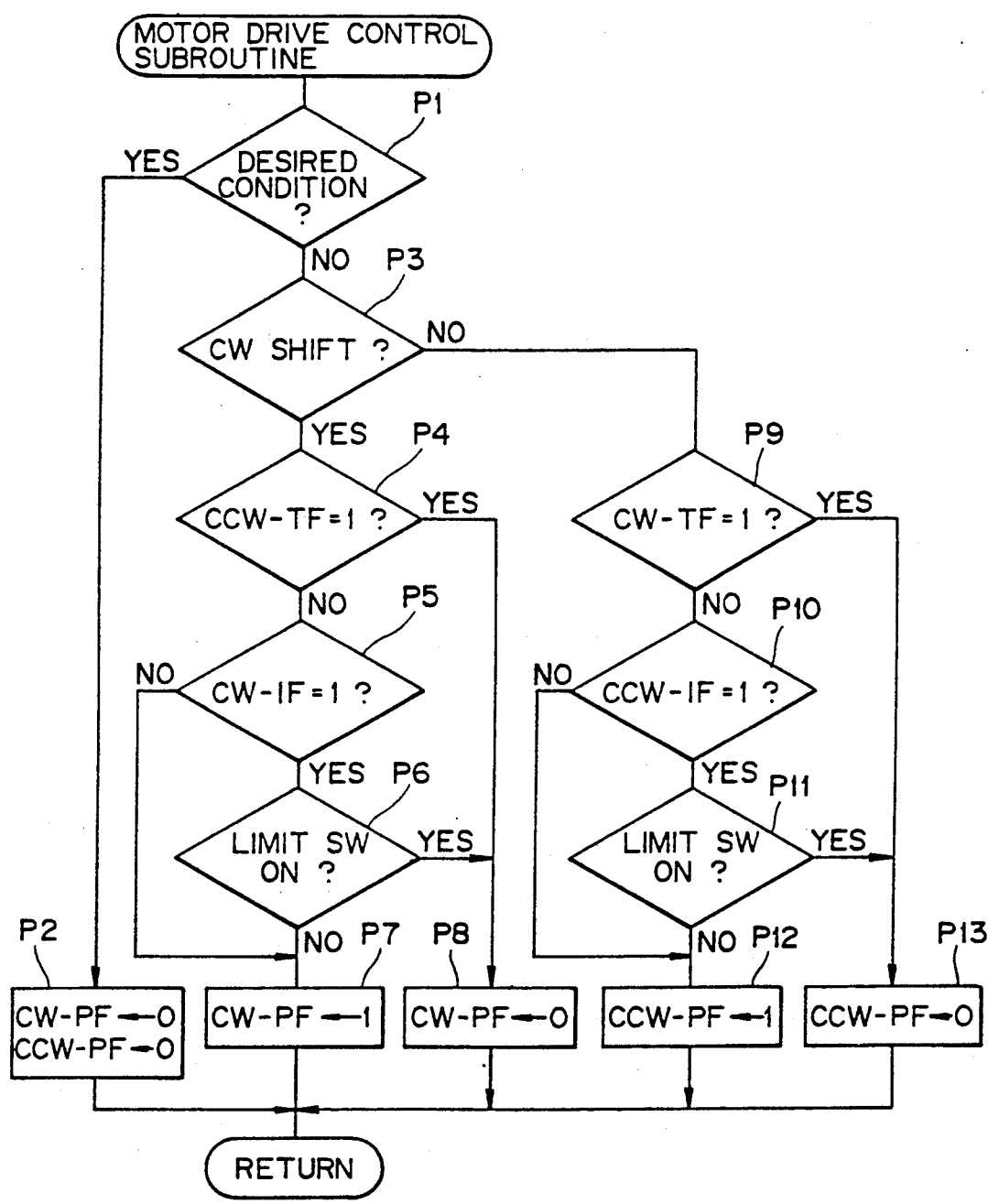
FIG. 11 is a flow chart illustrating a motor drive control subroutine for the microcomputer.

Referring to FIG. 11, which is a flow chart of the motor drive control subroutine, the first step P1 in FIG. 10 is to make a decision in step P1 whether or not the center differential is in a desired drive condition specified by the driver through the condition selecting unit 68. If the answer to the decision is yes, indicating the present drive condition of the center differential is in conformity with the desired drive condition, both the CW-PF and CCW-PF flags are set to 0 in step P2, thereby stopping any rotation of the motor 61.

If the answer to the decision in step P1 is no, a decision is made in step P3: "should the center differential be shifted in a CW shift direction?" It is to be noted that the term "CW shift direction" as used herein shall mean and refer to the shift direction from two wheel drive (P2) toward four wheel drive with a differential unlocked condition (P4F) via four wheel drive with a differential locked condition (P4L) and the term "CCW shift direction" to the shift direction from four wheel drive with a differential unlocked condition (P4F) toward two wheel drive (P2) via four wheel drive with a differential locked condition (P4L). If the answer is yes, indicating that the motor 61 has to be rotated so as to shift the center differential in the CW shift direction from two wheel drive (P2) to four wheel drive with a differential locked condition (P4L) or from four wheel drive with a differential locked condition (P4L) to four wheel drive with a differential unlocked condition (P4F), a decision is made in step P4 to judge whether or not the timer flag CCW-TF has been set to 1. As was previously noted, the timer flag CCW-TF set to 1 means that the control unit 60 has controlled the relay switch 70 to provide the motor drive circuit 69 with a motor drive signal CS-CCW until the time t1 and the decision has been made between the times t1 and t3. If the answer to the decision in step P4 is no, a decision is further made in step P5: "is the limit switch flag CW-LF set to 1?" If the answer to the decision in step P5 is yes, a decision is made in step P6 whether or not the limit switch 92 is on. If the limit switch 92 is not on, then, the power flag CW-PF is set to 1 in step P7 so as to allow the motor 61 to rotate in the CW direction. If the answer to the decision in step P5 is no, the power flag CW-PF is set to 1 without making the decision in step P6.

In the event of a yes decision in step or P6, step P8 is taken to set the power flag CW-PF to 0 so as to prevent the motor 61 from rotating in the CW direction.

If the answer to the decision in step P3 regarding center differential shift direction is no, this indicates the motor 61 is needed to rotate in the CCW direction. Then, steps P9 to P13 are taken. Procedures in steps P9 to P13 are the same as in steps P4 to P8 excepting that the power flag set to 1 and 0 in steps P12 and P13, respectively, is not power flag CW-PF but power flag CCW-PF. Because the procedures in steps P9 to P13 are identical to steps P4 to P8, they need not be explained herein.

The final step P2, P7, P8, P12 or P13, after setting the power flags CW-PF and/or CCW-PF, orders return to the main routine to call for the timer control subroutine in step S4.

Timer Control Subroutine

Referring to FIG. 12, which is a flow chart of the timer control subroutine, and initially to FIG. 12A, the first step Q1 is to make a decision whether or not the power flag CW-PF is set to 1. If the answer to the decision is yes, indicating the motor 61 is rotating in the CW direction, then an order signal flag OCW-PF is set to 1 in step Q2, which indicates that the steps Q3 and Q4 are to be carried out. A CW count-down timer sets its initial count value to a specific time of, for example, 200 msecs. in step Q3. Thereafter, after setting the timer flag CW-TF to 1 in step Q4, the subroutine proceeds to step Q11.

If the answer to the decision made in step Q1 regarding the power flag CW-PF is no, then, another decision is made in step Q5 whether or not the order signal flag OCW-PF set to 1. It the answer to the decision in Q5 is yes, then the order signal flag OCW-PF is set to 0 in step Q6, which indicates that steps Q3 and Q4 are not to be carried out, and then, the step Q11 is taken.

The procedures in steps Q2, Q5 and Q6 are necessary to detect a timing at which a motor drive signal CS-CW disappears. If the answer to the decision in step Q5 is no, the CW count-down timer is actuated to count down the specific time after the disappearance of motor drive signal CS-CW in step Q7. After the actuation of the CW count-down timer, a decision is made in step Q8 whether or not the value V of the CW count-down timer is larger than zero (0). If the answer is yes, the step Q11 is taken. Otherwise, if the answer is no, indicating the CW count-down timer has counted down the specific time, then, after resetting the CW count-down timer to its initial value equivalent to the specific time and setting the timer flag CW-TF to 0 in steps Q9 and Q10, respectively, the step Q11 is taken.

The steps Q1 to Q10 are taken in the event a motor control signal CS-CW is applied to the motor 61 until the time t1. If a motor control signal CS-CCW is applied to the motor 61 until the time t1, steps similar to the steps Q1 to Q10 are taken, beginning at step Q11.

Figure 12B:
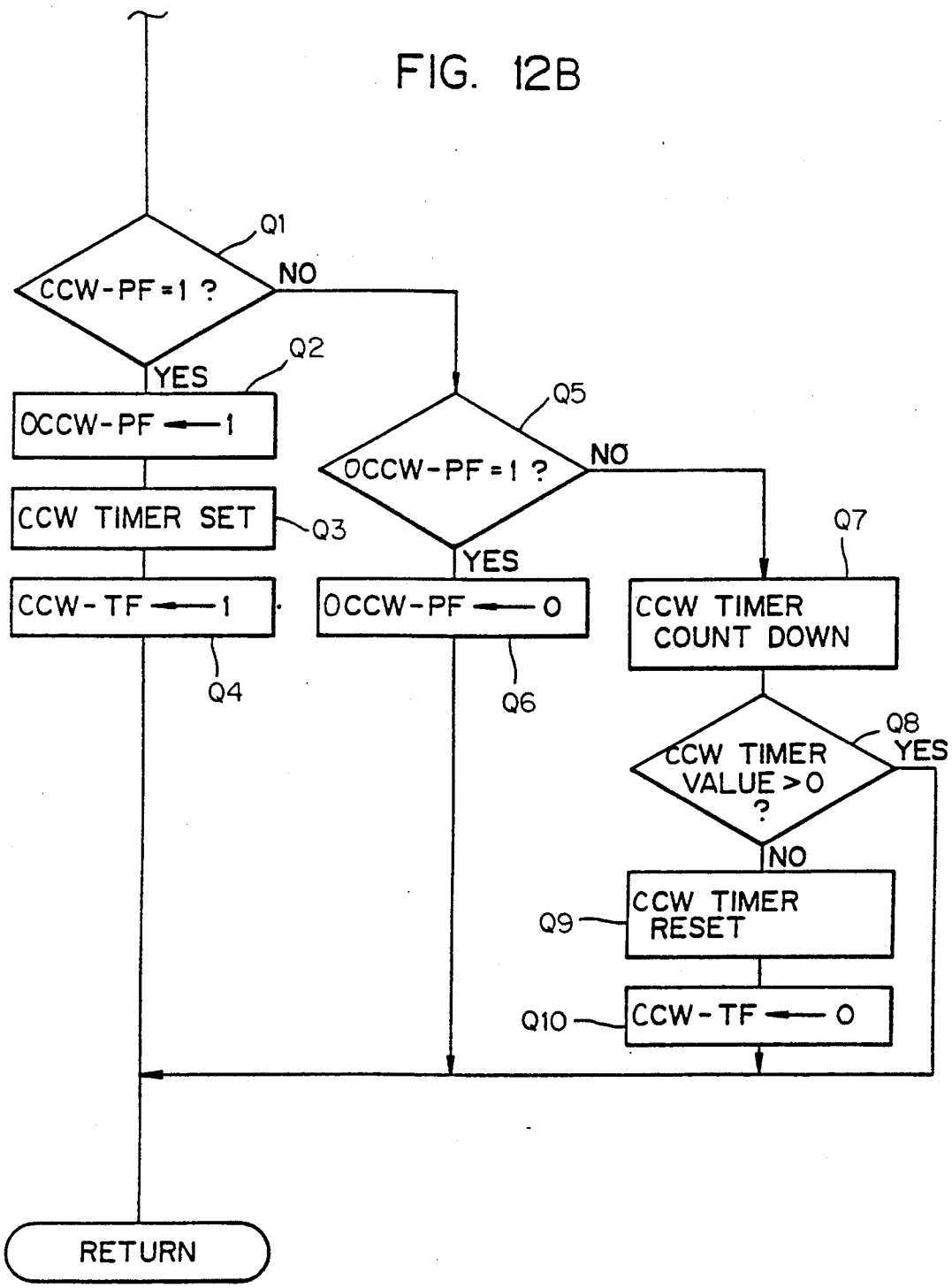

Referring to FIG. 12B, in step Q11, a decision is made as to whether or not the power flag CCW-PF is set to 1. If the answer to the decision is yes, indicating the motor 61 is rotating in the CCW direction, then an order signal flag OCCW-PF is set to 1 in step Q12, which indicates that the steps Q13 and Q14 are to be carried out. A CCW count-down timer sets its initial count value to a specific time of, for example, 200 msecs. in step Q13. Thereafter, after setting the timer flag CCW-TF to 1 in step Q14, the subroutine orders a return to the main routine shown in FIG. 10.

If the answer to the decision regarding the power flag CCW-PF is no, then, another decision is made in step Q15 whether or not the order flag OCCW-pF is set to 1. If the answer to the decision in step Q15 is yes, then the order signal flag OCCW-PF is set to 0 in step Q16, Which indicates that steps Q13 and Q14 are not to be carried out, and then, the step Q11 is taken.

The procedures in steps Q12, Q15 and Q16 are necessary to detect a timing at which the motor drive signal CS-CCW disappears. If the answer to the decision in step Q16 is no, the CCW count-down timer is actuated to count down the specific time after the disappearance of motor drive signal CS-CCW in step Q17. After the actuation of the CCW count-down timer, a decision is made in step Q18 whether or not the value V of the CCW count-down timer is larger than zero (0). If the answer is yes, the subroutine orders a return to the main routine shown in FIG. 10. Otherwise, if the answer is no, indicating the CCW count-down timer has counted down the specific time, then, after resetting the CCW count-down timer to its initial value equivalent to the specific time and setting the timer flag CCW-TF to 0 in steps Q19 and Q20, respectively, the timer control subroutine orders return to the main routine. The final step, in any event, in the timer control subroutine is to order a return to the main routine to call for the motor drive interrupt subroutine in step S5.

Motor Drive Interrupt Subroutine

Figure 13:
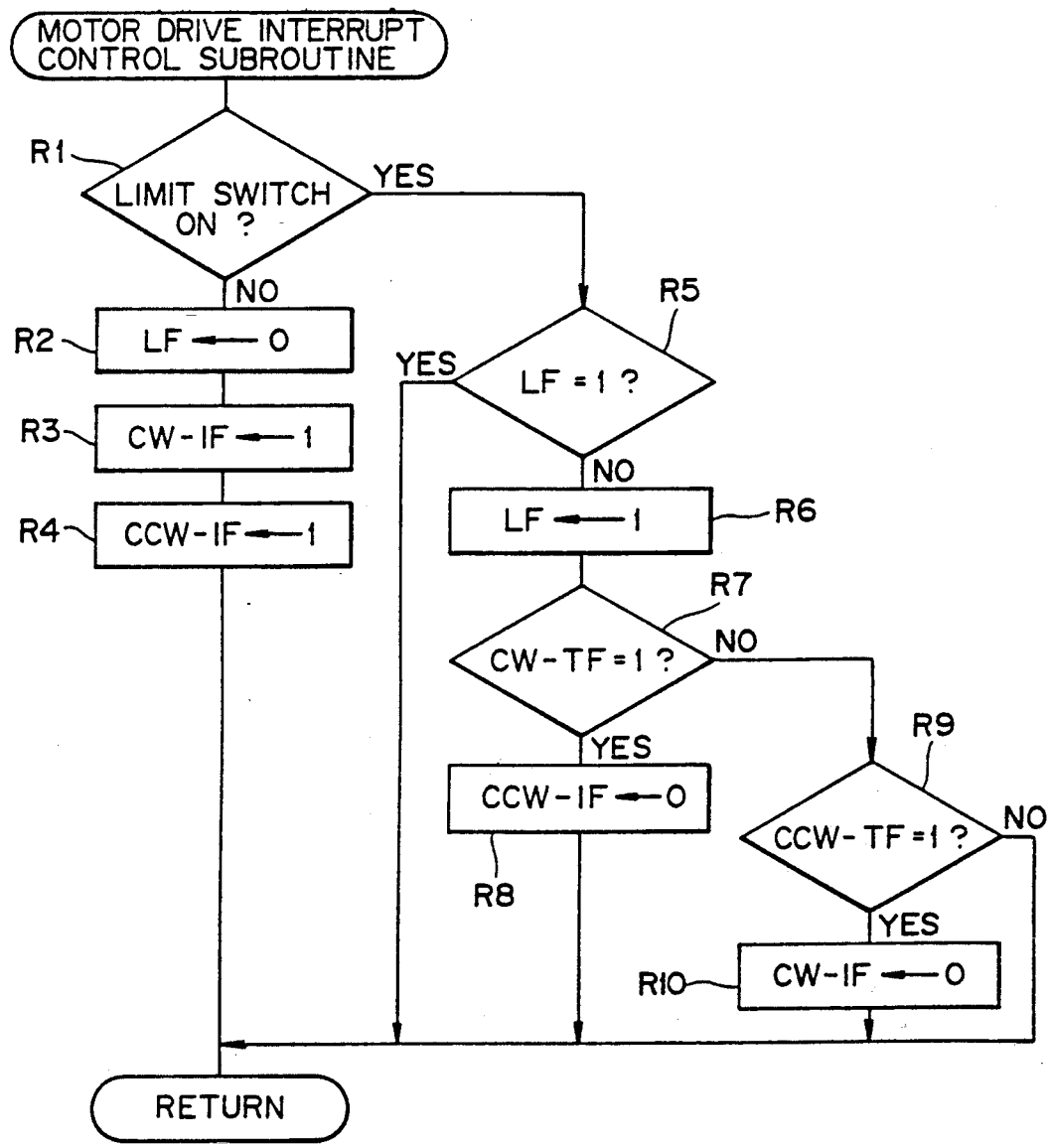
FIG. 13 is a flow chart illustrating a motor drive interrupt control subroutine for the microcomputer.

Referring to FIG. 13, which is a flow chart of the motor drive interrupt subroutine, the first step R1 is to make a decision whether or not the limit switch 92 is on. If the answer to the decision is no, indicating no over load is on the motor 61, then, after setting the limit switch flag LF to 0, both the motor drive interrupt flags CW-IF and CCW-IF are set to 1 in steps R3 and R4 in order. Thereafter, the main routine is called for to take step S2.

If the answer to the decision regarding the condition of the limit switch 92 is yes, indicating a relative displacement is caused between the drive and driven gears 94 and 96 due to an over load on the motor 61, another decision is made in step R5 whether or not the limit switch flag LF has been set to 1. If the answer is yes, the motor drive interrupt subroutine immediately terminates and the main routine is called for to take step S2. On the other hand, if the answer to the decision in step R5 is no, indicating the limit switch 92 has been actuated or is on, then, after setting the limit switch flag LF to 1, a decision is made in step R7 whether or not the timer flag CW-TF has been set to 1. If the answer to the decision in step R7 is yes, the motor drive interrupt flag CCW-IF is set to 0 in step R8 so as to allow the motor 61 to rotate. However, if the answer to the decision in step R7 is no, a final decision is made in step R9 whether or not the timer flag CCW-TF has been set to 1. After setting the motor drive interrupt flag CW-IF to 0 in step R10 if the answer to the decision R9 is yes or directly after the decision if the answer is no, the main routine is called for to take step S2.

Although the present invention has been fully described by way of the preferred embodiment thereof with reference to the accompanying drawings, it is to be noted that various changes and modifications are apparent to those skilled in the art. Therefore, unless such changes and modifications depart from the true scope of the present invention, they should be construed as included therein.

What is claimed is:

1. An apparatus for shifting a transfer gear assembly of a vehicle, having a center differential, between at least two wheel drive and four wheel drive conditions, the apparatus comprising:

shift means driven by a reversible motor for moving between at least two positions and shifting said transfer gear assembly between said at least two wheel drive and four wheel drive conditions;

a drive condition sensor for providing position signals which direct said shift means to move to a desired one of said at least two positions and shift said transfer gear assembly into a desired drive condition of said at least two wheel drive and four wheel drive conditions;

control means for providing a drive signal which continuously causes said reversible motor to rotate in one direction of rotation according to said position signals so as to move said shift means to said desired one of said at least two positions; and over load detecting means for being actuated when loads larger than a set load are on said reversible motor, said over load detecting means providing a motor stop signal for stopping said reversible motor when said over load detecting means is actuated;

wherein said control means includes a timer for counting down a set time period after a disappearance of said drive signal from said control means and forbids said reversible motor to rotate in another direction of rotation while said time counting means counts down said set time period.

2. An apparatus as defined in claim 1, wherein said shift means is movable among three axial positions for shifting said transfer gear assembly into a two wheel drive condition, a four wheel drive with a differential locked condition and a four wheel drive with a differential unlocked condition.

3. An apparatus as defined in claim 1, and further comprising a relay switch unit for allowing said control means to provide a drive signal which causes said reversible motor to rotate in the other direction of rotation after said set time period has been counted down.

4. An apparatus as defined in claim 3, wherein said shift means is movable among three axial positions for shifting said transfer gear assembly into a two wheel drive condition, a four wheel drive with a differential locked condition and a four wheel drive with a differential unlocked condition.

* * * * *